(12) United States Patent
Hansen et al.

(10) Patent No.: US 7,753,267 B2
(45) Date of Patent: **\*Jul. 13, 2010**

(54) IN-LANE MONEY TRANSFER SYSTEMS AND METHODS

(75) Inventors: Kurt Hansen, Parker, CO (US); Thomas Sayor, Castle Rock, CO (US)

(73) Assignee: The Western Union Company, Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/125,757

(22) Filed: May 22, 2008

(65) Prior Publication Data

US 2008/0222013 A1    Sep. 11, 2008

Related U.S. Application Data

(63) Continuation of application No. 11/132,725, filed on May 18, 2005, now Pat. No. 7,392,940.

(51) Int. Cl.
*G06K 5/00* (2006.01)
*G07F 19/00* (2006.01)
*G06F 7/08* (2006.01)

(52) U.S. Cl. ............... 235/380; 235/379; 235/381
(58) Field of Classification Search ......... 235/379–381; 705/16, 30, 35, 39, 42–44
See application file for complete search history.

(56) References Cited

U.S. PATENT DOCUMENTS

| | | | |
|---|---|---|---|
| 3,599,151 A | 8/1971 | Harr | |
| 3,783,755 A | 1/1974 | Lagin | |
| 3,833,395 A | 9/1974 | Gosnell | |
| 4,032,931 A | 6/1977 | Haker | |
| 4,321,672 A | 3/1982 | Braun et al. | |

(Continued)

FOREIGN PATENT DOCUMENTS

EP    481135 A1    4/1992

(Continued)

OTHER PUBLICATIONS

"Western Union Quick Collect"; 2 pages.

(Continued)

*Primary Examiner*—Thien M. Le
*Assistant Examiner*—April A Taylor
(74) *Attorney, Agent, or Firm*—Townsend and Townsend and Crew LLP

(57) ABSTRACT

The present invention provides systems and methods to initiate, facilitate, process and/or perform money transfers. One such method includes receiving a request for a transfer pair verification from a vendor location (360), and verifying that the transfer pair is associated with a valid transfer pair record (362). The method includes sending the transfer pair verification to the vendor location (368), receiving a money transfer request (370) associated with the transfer pair from the vendor location, and authorizing a money transfer (372) to at least one of a first and second customers associated with the transfer pair. In this manner, a vendor location, which may include a point-of-sale device and may be a retail outlet (e.g., grocery store, gas station, or the like), can be used to facilitate a money transfer between two customers.

39 Claims, 4 Drawing Sheets

U.S. PATENT DOCUMENTS

| | | |
|---|---|---|
| 4,385,285 A | 5/1983 | Horst et al. |
| 4,454,414 A | 6/1984 | Benton |
| 4,562,340 A | 12/1985 | Tateisi et al. |
| 4,562,341 A | 12/1985 | Ohmae et al. |
| 4,630,200 A | 12/1986 | Ohmae et al. |
| 4,678,895 A | 7/1987 | Tateisi et al. |
| 4,722,554 A | 2/1988 | Pettit |
| 4,795,892 A | 1/1989 | Gilmore et al. |
| 4,812,628 A | 3/1989 | Boston et al. |
| 4,823,264 A | 4/1989 | Deming |
| 4,829,168 A | 5/1989 | Nakahara |
| 4,902,881 A | 2/1990 | Janku |
| 4,961,142 A | 10/1990 | Elliott et al. |
| 4,972,318 A | 11/1990 | Brown et al. |
| 5,021,967 A | 6/1991 | Smith |
| 5,053,607 A | 10/1991 | Carlson et al. |
| 5,119,293 A | 6/1992 | Hammond |
| 5,175,682 A | 12/1992 | Higashiyama et al. |
| 5,220,501 A | 6/1993 | Lawlor et al. |
| 5,233,167 A | 8/1993 | Markman et al. |
| 5,283,829 A | 2/1994 | Anderson |
| 5,350,906 A | 9/1994 | Brody et al. |
| 5,367,452 A | 11/1994 | Gallery et al. |
| 5,408,077 A | 4/1995 | Campo et al. |
| 5,426,594 A | 6/1995 | Wright et al. |
| 5,448,043 A | 9/1995 | Nakano et al. |
| 5,461,217 A | 10/1995 | Claus |
| 5,464,971 A | 11/1995 | Sutcliffe et al. |
| 5,465,206 A | 11/1995 | Hilt et al. |
| 5,477,037 A | 12/1995 | Berger |
| 5,477,038 A | 12/1995 | Levine et al. |
| 5,484,988 A | 1/1996 | Hills et al. |
| 5,491,325 A | 2/1996 | Huang et al. |
| 5,504,677 A | 4/1996 | Pollin |
| 5,510,979 A | 4/1996 | Moderi et al. |
| 5,513,117 A | 4/1996 | Small |
| 5,524,073 A | 6/1996 | Stambler |
| 5,546,523 A | 8/1996 | Gatto |
| 5,550,734 A | 8/1996 | Tarter et al. |
| 5,555,496 A | 9/1996 | Tackbary et al. |
| 5,557,516 A | 9/1996 | Hogan |
| 5,570,465 A | 10/1996 | Tsakanikas |
| 5,577,109 A | 11/1996 | Stimson et al. |
| 5,604,802 A | 2/1997 | Holloway |
| 5,622,388 A | 4/1997 | Alcordo |
| 5,629,982 A | 5/1997 | Micali |
| 5,638,283 A | 6/1997 | Herbert |
| 5,649,117 A | 7/1997 | Landry |
| 5,650,604 A | 7/1997 | Marcous et al. |
| 5,657,201 A | 8/1997 | Kochis |
| 5,677,955 A | 10/1997 | Doggett et al. |
| 5,679,940 A | 10/1997 | Templeton et al. |
| 5,686,713 A | 11/1997 | Rivera |
| 5,699,528 A | 12/1997 | Hogan |
| 5,717,868 A | 2/1998 | James |
| 5,721,768 A | 2/1998 | Stimson et al. |
| 5,732,136 A | 3/1998 | Murphree et al. |
| 5,732,400 A | 3/1998 | Mandler et al. |
| 5,745,886 A | 4/1998 | Rosen |
| 5,757,917 A | 5/1998 | Rose et al. |
| 5,764,888 A | 6/1998 | Bolan et al. |
| 5,774,879 A | 6/1998 | Custy et al. |
| 5,777,305 A | 7/1998 | Smith et al. |
| 5,778,067 A | 7/1998 | Jones et al. |
| 5,779,379 A | 7/1998 | Mason et al. |
| 5,783,808 A | 7/1998 | Josephson |
| 5,787,403 A | 7/1998 | Randle |
| 5,794,207 A | 8/1998 | Walker et al. |
| 5,799,072 A | 8/1998 | Vulcan et al. |
| 5,806,045 A | 9/1998 | Biorge et al. |
| 5,815,657 A | 9/1998 | Williams et al. |
| 5,825,617 A | 10/1998 | Kochis et al. |
| 5,826,241 A | 10/1998 | Stein et al. |
| 5,828,875 A | 10/1998 | Halvarsson et al. |
| 5,832,457 A | 11/1998 | O'Brien et al. |
| 5,832,463 A | 11/1998 | Funk |
| 5,859,419 A | 1/1999 | Wynn |
| 5,865,470 A | 2/1999 | Thompson |
| 5,868,236 A | 2/1999 | Rademacher |
| 5,870,718 A | 2/1999 | Spector |
| 5,875,435 A | 2/1999 | Brown |
| 5,878,211 A | 3/1999 | Delagrange et al. |
| 5,880,446 A | 3/1999 | Mori et al. |
| 5,893,080 A | 4/1999 | McGurl et al. |
| 5,896,298 A | 4/1999 | Richter |
| 5,897,625 A | 4/1999 | Gustin et al. |
| 5,897,989 A | 4/1999 | Beecham |
| 5,898,154 A | 4/1999 | Rosen |
| 5,899,980 A | 5/1999 | Wilf et al. |
| 5,899,982 A | 5/1999 | Randle |
| 5,902,983 A | 5/1999 | Crevelt et al. |
| 5,903,633 A | 5/1999 | Lorsch |
| 5,903,880 A | 5/1999 | Biffar |
| 5,903,881 A | 5/1999 | Schrader et al. |
| 5,909,492 A | 6/1999 | Payne et al. |
| 5,909,673 A | 6/1999 | Gregory |
| 5,910,988 A | 6/1999 | Ballard |
| 5,913,202 A | 6/1999 | Motoyama |
| 5,915,023 A | 6/1999 | Bernstein |
| 5,920,629 A | 7/1999 | Rosen |
| 5,920,847 A | 7/1999 | Kolling et al. |
| 5,920,848 A | 7/1999 | Schutzer et al. |
| 5,923,016 A | 7/1999 | Fredregill et al. |
| 5,937,396 A | 8/1999 | Konya |
| 5,949,044 A | 9/1999 | Walker et al. |
| 5,952,639 A | 9/1999 | Ohki et al. |
| 5,953,709 A | 9/1999 | Gilbert et al. |
| 5,953,710 A | 9/1999 | Fleming |
| 5,960,412 A | 9/1999 | Tackbary et al. |
| 5,963,647 A | 10/1999 | Downing et al. |
| 5,974,146 A | 10/1999 | Randle et al. |
| 5,974,194 A | 10/1999 | Hirani et al. |
| RE36,365 E | 11/1999 | Levine et al. |
| 5,978,780 A | 11/1999 | Watson |
| 5,987,426 A | 11/1999 | Goodwil, III |
| 5,991,748 A | 11/1999 | Taskett |
| 5,993,047 A | 11/1999 | Novogrod et al. |
| 5,999,624 A | 12/1999 | Hopkins |
| 6,003,763 A | 12/1999 | Gallagher et al. |
| 6,011,833 A | 1/2000 | West |
| 6,012,048 A | 1/2000 | Gustin |
| 6,015,087 A | 1/2000 | Seifert et al. |
| 6,018,724 A | 1/2000 | Arent |
| 6,027,216 A | 2/2000 | Guyton et al. |
| 6,029,150 A | 2/2000 | Kravitz |
| 6,030,000 A | 2/2000 | Diamond |
| 6,032,133 A | 2/2000 | Hilt et al. |
| 6,032,136 A | 2/2000 | Brake, Jr. et al. |
| 6,032,137 A | 2/2000 | Ballard |
| 6,035,285 A | 3/2000 | Schlect et al. |
| 6,035,406 A | 3/2000 | Moussa et al. |
| 6,039,245 A | 3/2000 | Symonds et al. |
| 6,039,250 A | 3/2000 | Ito et al. |
| 6,044,360 A | 3/2000 | Picciallo |
| 6,044,362 A | 3/2000 | Neely |
| 6,045,039 A | 4/2000 | Stinson et al. |
| 6,047,268 A | 4/2000 | Bartoli et al. |
| 6,052,674 A | 4/2000 | Zervides et al. |
| 6,058,417 A | 5/2000 | Hess et al. |
| 6,061,799 A | 5/2000 | Eldridge et al. |
| 6,064,990 A | 5/2000 | Goldsmith |
| 6,070,150 A | 5/2000 | Remington et al. |
| 6,070,156 A | 5/2000 | Hartsell et al. |
| 6,070,798 A | 6/2000 | Nethery |

| | | | | | | |
|---|---|---|---|---|---|---|
| 6,078,907 | A | 6/2000 | Lamm | 6,526,130 | B1 | 2/2003 | Paschini |
| 6,081,790 | A | 6/2000 | Rosen | 6,539,363 | B1 | 3/2003 | Allgeier et al. |
| 6,088,683 | A | 7/2000 | Jalili | 6,547,132 | B1 | 4/2003 | Templeton et al. |
| 6,088,684 | A | 7/2000 | Custy et al. | 6,549,119 | B1 | 4/2003 | Turner |
| 6,097,834 | A | 8/2000 | Krouse et al. | 6,554,184 | B1 | 4/2003 | Amos |
| 6,098,053 | A | 8/2000 | Slater | 6,575,358 | B2 | 6/2003 | O'Callaghan et al. |
| 6,104,815 | A | 8/2000 | Alcorn et al. | 6,601,038 | B1 | 7/2003 | Kolls |
| 6,106,020 | A | 8/2000 | Leef et al. | 6,609,113 | B1 | 8/2003 | O'Leary et al. |
| 6,119,106 | A | 9/2000 | Mersky et al. | RE38,255 | E | 9/2003 | Levine et al. |
| 6,119,931 | A | 9/2000 | Novogrod | 6,618,705 | B1 | 9/2003 | Wang et al. |
| 6,119,933 | A | 9/2000 | Wong et al. | 6,736,314 | B2 | 5/2004 | Cooper et al. |
| 6,122,625 | A | 9/2000 | Rosen | 6,761,309 | B2 | 7/2004 | Stoutenburg et al. |
| 6,128,602 | A | 10/2000 | Northington et al. | 6,761,311 | B1 | 7/2004 | Algiene et al. |
| 6,128,603 | A | 10/2000 | Dent et al. | 6,814,282 | B2 | 11/2004 | Seifert et al. |
| 6,129,275 | A | 10/2000 | Urquhart et al. | 6,827,260 | B2 | 12/2004 | Stoutenburg et al. |
| 6,134,561 | A | 10/2000 | Brandien et al. | 6,829,588 | B2 | 12/2004 | Stoutenburg et al. |
| 6,145,738 | A | 11/2000 | Stinson et al. | 6,847,947 | B1 | 1/2005 | Kambour et al. |
| 6,148,377 | A | 11/2000 | Carter et al. | 6,854,651 | B2 | 2/2005 | Smith et al. |
| 6,149,056 | A | 11/2000 | Stinson et al. | 6,886,742 | B2 | 5/2005 | Stoutenburg et al. |
| 6,164,528 | A | 12/2000 | Hills et al. | 6,908,031 | B2 | 6/2005 | Seifert et al. |
| 6,167,386 | A | 12/2000 | Brown | 6,922,673 | B2 | 7/2005 | Karas et al. |
| 6,175,823 | B1 | 1/2001 | Van Dusen | 6,938,013 | B1 | 8/2005 | Guiitierrez-Sheris |
| 6,178,409 | B1 | 1/2001 | Weber et al. | 7,092,916 | B2 | 8/2006 | Diveley et al. |
| 6,189,787 | B1 | 2/2001 | Dorf | 7,103,577 | B2 | 9/2006 | Blair et al. |
| 6,193,152 | B1 | 2/2001 | Fernando et al. | 7,104,440 | B2 | 9/2006 | Hansen et al. |
| 6,193,155 | B1 | 2/2001 | Walker et al. | 7,107,249 | B2 | 9/2006 | Diveley et al. |
| 6,199,761 | B1 | 3/2001 | Drexler | 7,158,955 | B2 | 1/2007 | Diveley et al. |
| 6,202,054 | B1 | 3/2001 | Lawlor et al. | 7,182,252 | B1 | 2/2007 | Cooper et al. |
| 6,206,283 | B1 | 3/2001 | Bansal et al. | 7,195,151 | B2 | 3/2007 | Licciardello et al. |
| RE37,122 | E | 4/2001 | Levine et al. | 7,398,252 | B2 * | 7/2008 | Neofytides et al. ............ 705/64 |
| 6,216,227 | B1 | 4/2001 | Goldstein et al. | 2001/0032878 | A1 | 10/2001 | Tsiounis et al. |
| 6,223,166 | B1 | 4/2001 | Kay | 2001/0051876 | A1 | 12/2001 | Seigel et al. |
| 6,223,168 | B1 | 4/2001 | McGurl et al. | 2001/0054003 | A1 | 12/2001 | Chien et al. |
| 6,246,996 | B1 | 6/2001 | Stein et al. | 2002/0007320 | A1 | 1/2002 | Hogan et al. |
| 6,247,047 | B1 | 6/2001 | Wolff | 2002/0016769 | A1 | 2/2002 | Barbara et al. |
| 6,260,024 | B1 | 7/2001 | Shkedy | 2002/0023055 | A1 | 2/2002 | Antognini et al. |
| 6,263,446 | B1 | 7/2001 | Kausik et al. | 2002/0032653 | A1 | 3/2002 | Schutzer |
| 6,269,369 | B1 | 7/2001 | Robertson | 2002/0046106 | A1 | 4/2002 | Ishibashi et al. |
| 6,275,829 | B1 | 8/2001 | Angiulo et al. | 2002/0046116 | A1 | 4/2002 | Hohle et al. |
| 6,282,522 | B1 | 8/2001 | Davis et al. | 2002/0062285 | A1 | 5/2002 | Amann |
| 6,286,756 | B1 | 9/2001 | Stinson et al. | 2002/0076018 | A1 | 6/2002 | Banks et al. |
| 6,289,322 | B1 | 9/2001 | Kitchen et al. | 2002/0087337 | A1 | 7/2002 | Hensley |
| 6,292,789 | B1 | 9/2001 | Schutzer | 2002/0087462 | A1 | 7/2002 | Stoutenburg et al. |
| 6,305,604 | B1 | 10/2001 | Ono | 2002/0087463 | A1 | 7/2002 | Fitzgerald et al. |
| 6,308,887 | B1 | 10/2001 | Korman et al. | 2002/0087467 | A1 | 7/2002 | Mascavage et al. |
| 6,314,169 | B1 | 11/2001 | Schelberg, Jr. et al. | 2002/0087469 | A1 | 7/2002 | Ganesan et al. |
| 6,317,745 | B1 | 11/2001 | Thomas et al. | 2002/0104026 | A1 | 8/2002 | Barra et al. |
| 6,321,211 | B1 | 11/2001 | Dodd | 2002/0111908 | A1 | 8/2002 | Milberger et al. |
| 6,321,984 | B1 | 11/2001 | McCall et al. | 2002/0143566 | A1 | 10/2002 | Diveley et al. |
| 6,321,987 | B1 | 11/2001 | Watanabe et al. | 2002/0143706 | A1 | 10/2002 | Diveley et al. |
| 6,327,348 | B1 | 12/2001 | Walker et al. | 2002/0143709 | A1 | 10/2002 | Diveley et al. |
| 6,327,570 | B1 | 12/2001 | Stevens | 2002/0152168 | A1 | 10/2002 | Neofytides et al. |
| 6,327,575 | B1 | 12/2001 | Katz | 2002/0152176 | A1 | 10/2002 | Neofytides et al. |
| 6,334,108 | B1 | 12/2001 | Deaton et al. | 2002/0153414 | A1 | 10/2002 | Stoutenburg et al. |
| 6,343,279 | B1 | 1/2002 | Bissonette et al. | 2002/0161702 | A1 | 10/2002 | Milberger et al. |
| 6,347,305 | B1 | 2/2002 | Watkins | 2002/0169719 | A1 | 11/2002 | Dively et al. |
| 6,360,254 | B1 | 3/2002 | Linden et al. | 2002/0174016 | A1 | 11/2002 | Cuervo |
| 6,367,693 | B1 | 4/2002 | Novogrod | 2002/0195486 | A1 | 12/2002 | Erb et al. |
| 6,370,240 | B1 | 4/2002 | Woynoski et al. | 2003/0001005 | A1 | 1/2003 | Risafi et al. |
| 6,386,444 | B1 | 5/2002 | Sullivan | 2003/0014371 | A1 | 1/2003 | Turgeon |
| 6,394,343 | B1 | 5/2002 | Berg et al. | 2003/0024979 | A1 | 2/2003 | Hansen et al. |
| 6,408,284 | B1 | 6/2002 | Hilt et al. | 2003/0028491 | A1 | 2/2003 | Cooper |
| 6,411,942 | B1 | 6/2002 | Fujimoto | 2003/0053609 | A1 | 3/2003 | Risafi et al. |
| 6,415,271 | B1 | 7/2002 | Turk et al. | 2003/0055689 | A1 | 3/2003 | Block et al. |
| 6,438,586 | B1 | 8/2002 | Hass | 2003/0055780 | A1 | 3/2003 | Hansen et al. |
| 6,449,599 | B1 | 9/2002 | Payne et al. | 2003/0061171 | A1 | 3/2003 | Gilbert et al. |
| 6,453,300 | B2 | 9/2002 | Simpson | 2003/0069856 | A1 | 4/2003 | Seifert et al. |
| 6,473,500 | B1 | 10/2002 | Risafi et al. | 2003/0111529 | A1 | 6/2003 | Templeton et al. |
| 6,484,936 | B1 | 11/2002 | Nicoll et al. | 2003/0120777 | A1 | 6/2003 | Thompson et al. |
| 6,488,203 | B1 | 12/2002 | Stoutenburg et al. | 2003/0126036 | A1 | 7/2003 | Mascavage et al. |
| 6,502,745 | B1 | 1/2003 | Stimson et al. | 2003/0126075 | A1 | 7/2003 | Mascavage et al. |
| 6,502,747 | B1 | 1/2003 | Stoutenburg et al. | 2003/0126083 | A1 | 7/2003 | Seifert et al. |
| 6,510,453 | B1 | 1/2003 | Apfel et al. | 2003/0130907 | A1 | 7/2003 | Karas et al. |

| | | | |
|---|---|---|---|
| 2003/0130940 | A1 | 7/2003 | Hansen et al. |
| 2003/0130948 | A1 | 7/2003 | Algiene et al. |
| 2003/0135459 | A1 | 7/2003 | Abelman et al. |
| 2003/0149662 | A1 | 8/2003 | Shore |
| 2003/0154164 | A1 | 8/2003 | Mascavage et al. |
| 2003/0167237 | A1 | 9/2003 | Degen et al. |
| 2003/0177067 | A1 | 9/2003 | Cowell et al. |
| 2003/0187789 | A1 | 10/2003 | Karas et al. |
| 2003/0187791 | A1 | 10/2003 | Weichert et al. |
| 2003/0187792 | A1 | 10/2003 | Hansen et al. |
| 2003/0195811 | A1 | 10/2003 | Hayes et al. |
| 2003/0208445 | A1 | 11/2003 | Compiano |
| 2003/0222135 | A1 | 12/2003 | Stoutenburg et al. |
| 2003/0222136 | A1 | 12/2003 | Bolle et al. |
| 2003/0225689 | A1 | 12/2003 | MacFarlane et al. |
| 2004/0007618 | A1 | 1/2004 | Oram et al. |
| 2004/0015438 | A1 | 1/2004 | Compiano |
| 2004/0024701 | A1 | 2/2004 | Hansen et al. |
| 2004/0059672 | A1 | 3/2004 | Baig et al. |
| 2004/0068437 | A1 | 4/2004 | McGee et al. |
| 2004/0078327 | A1 | 4/2004 | Frazier et al. |
| 2004/0088248 | A1 | 5/2004 | Cutler |
| 2004/0088261 | A1 | 5/2004 | Moore et al. |
| 2004/0098328 | A1 | 5/2004 | Grant et al. |
| 2004/0098335 | A1 | 5/2004 | Michelsen |
| 2004/0107165 | A1 | 6/2004 | Blair et al. |
| 2004/0117302 | A1 | 6/2004 | Weichert et al. |
| 2004/0138947 | A1 | 7/2004 | McGee et al. |
| 2004/0139008 | A1 | 7/2004 | Mascavage et al. |
| 2004/0143552 | A1 | 7/2004 | Weichert et al. |
| 2004/0148286 | A1 | 7/2004 | Rogers |
| 2004/0153398 | A1 | 8/2004 | Baumgartner et al. |
| 2004/0158521 | A1 | 8/2004 | Newton et al. |
| 2004/0164145 | A1 | 8/2004 | Licciardello et al. |
| 2004/0167860 | A1 | 8/2004 | Baxter et al. |
| 2004/0193897 | A1 | 9/2004 | Van Volkenburgh |
| 2004/0205023 | A1 | 10/2004 | Hafer et al. |
| 2004/0210476 | A1 | 10/2004 | Blair et al. |
| 2004/0210506 | A1 | 10/2004 | Algiene et al. |
| 2004/0210521 | A1 | 10/2004 | Crea et al. |
| 2004/0210523 | A1 | 10/2004 | Gains et al. |
| 2004/0211831 | A1 | 10/2004 | Stoutenburg et al. |
| 2004/0254833 | A1 | 12/2004 | Algiene et al. |
| 2005/0004702 | A1 | 1/2005 | McDonald |
| 2005/0017067 | A1 | 1/2005 | Seifert |
| 2005/0107152 | A1 | 5/2005 | McGee et al. |
| 2005/0167481 | A1 | 8/2005 | Hansen et al. |
| 2005/0177716 | A1 | 8/2005 | Gintern et al. |
| 2005/0180550 | A1 | 8/2005 | McGee et al. |
| 2005/0187929 | A1 | 8/2005 | Staggs |
| 2005/0209958 | A1 | 9/2005 | Michelsen |
| 2005/0209961 | A1 | 9/2005 | Michelsen |
| 2005/0251440 | A1 | 11/2005 | Bednarek |
| 2006/0144927 | A1 | 7/2006 | Love |
| 2007/0063021 | A1 | 3/2007 | Chakiris et al. |
| 2007/0187484 | A1 | 8/2007 | Cooper et al. |

FOREIGN PATENT DOCUMENTS

| | | |
|---|---|---|
| EP | 949596 A2 | 10/1999 |
| EP | 1077436 A2 | 2/2001 |
| EP | 1607916 A1 | 12/2005 |
| WO | WO 00/22559 A1 | 4/2000 |
| WO | WO 00/46725 A1 | 8/2000 |
| WO | WO 00/67177 A2 | 11/2000 |
| WO | WO 01/04816 A1 | 1/2001 |
| WO | WO 02/05195 A1 | 1/2002 |

OTHER PUBLICATIONS

About Western Union: Company History; http://www.payment-solutions.com/history.html, 2005, 2 pages.
Aeromexico and Western Union Partner to Offer a Cash Payment Option for Booking Airline Tickets; 2004, Press Release, 2 pages.
American Express in New Ad Drive; 1990, American Banker, 1 page.
American Express Introduces Automated Money Order Dispenser; 1991, Professional Check Casher, 1 page.
American Express Money Orders, Travelers Cheques Now on Sale; 1936, Dots and Dashes, 2 pages.
American Express Unit Introduces State-Of-The-Art Automated Money Order Dispenser; 1990, Tri-State Food News, 1 page.
American Greeting Cards Click-Through; no date, 38 pages.
AmeriNet, Inc.: "The Best Idea in Payment Systems since the Credit Card", http://www.debit-it.com/, printed Feb. 7, 2000, 8 pages.
Amex aims expansion strategy at local currency exchanges; 1990, Crain's Chicago Business, 1 page.
Amex Money Order Dispenser; 1990, The Nilson Report, 1 page.
Amex tests Moneygram; 1990, Adnews, 1 page.
And a Nine—Second Money Order Dispenser; 1991, Post-News, vol. 17, No. 1, 1 page.
Andrejczak, Matt, "A Virginia start-up is reaching", Dialog File, American Banker-v164-date May 17, 1999 pp. 2.
Announcing Quick Collect Online; 2002, Western Union's Professional Collector, 3 pages.
Annual Report of First Data Corporation; 1998, 3 pages.
Annual Report of First Data Corporation; 1999, 2 pages.
Annual Report of the President of the Western Union Telegraph Company; 1873, pp. 8-11.
Annual Report of the President of the Western Union Telegraph Company; 1874, pp. 8-11.
Annual Report of the Western Union Corporation; 1990, 4 pages.
Annual Report of the Western Union Telegraph Co 1975, 3 Pages.
Annual Report of the Western Union Telegraph Company, 1940b, 4 pages.
Annual Report of the Western Union Telegraph Company; 1935, 2 pages.
Annual Report of the Western Union Telegraph Company; 1940, pp. 9 and 22.
Annual Report of the Western Union Telegraph Company; 1947, 2 pages.
Annual Report of the Western Union Telegraph Company; 1949, 2 pages.
Annual Report of the Western Union Telegraph Company; 1951, 2 pages.
Annual Report of the Western Union Telegraph Company; 1981, 2 pages.
Annual Report of the Western Union Telegraph Company; 1953, 2 pages.
Annual Report of the Western Union Telegraph Company; 1954, 3 pages.
Annual Report of the Western Union Telegraph Company; 1973, 5 pages.
Annual Report of the Western Union Telegraph Company; 1974, 2 pages.
Annual Report of the Western Union Telegraph Company; 1978, 3 pages.
AT&T Wireless to Offer Western Union SwiftPay as Replenishment Option for AT&T Free2Go Wireless Prepaid Customers; 2001, PR Newswire Association, 2 pages.
Behind the Scenes of Life; 1996, First Data Corporation Annual Report, 3 pages.
Bidpay.com: Whois search results; 2003, http://www.networksolutions.com/en_US/whois/results.jhtml;jsessionid+VZDZVYDD1J, 2 pages.
BidPay: Seller FAQs—Receiving Payments and Using the Money Order Service; 1999-2003, 7 pages.
billserv.com Launches bills.com, an internet Portal for Consumers to Pay All Bills Online at No Cost; 2000, Business Wire, 2 pages.
Boneh, Dan "Beaming Money by-Email is Web's Next killer App", PR Newswire, Nov. 16, 1999, pp. 1-4.
Business Wire, "E-Commerce, Email and E-greeting Cards Combine in New Web Site Designed by Interactive Bureau", Sep. 14, 1999 (abstract), [online] [retrieved on May 1, 2002], retrieved from PROQUEST Database, 2 pages.
Candygram payment service, no date, 1 page.

CES/NaBANCO Introduces Stored Value Card Technology: Blockbuster Video is First Merchant Partner; 1996, First Data Corporation News Release, 3 pages.
Collect your delinquent accounts by Telegraph; 1933, Form 1229-A, 1 page.
Collection by Money Transfer: MoneyGram Service Removes Time-Consuming Steps to Commercial Collections; 1990, Collector, p. 36.
Common Values: Uncommon Opportunities; 1995, First Data Corporation Annual Report, 2 pages.
Company Profile: The Western Union Convenience Pay Service; 2004, 4 pages.
Confinity, Inc., PayPal.com, How PayPal.com Works, download from website http://www.paypal.com on Feb. 7, 2000, 7 pages.
Dotbank, "The Way to Send and Receive Money on the Internet," download from website http://www.dotbank.com, Feb. 7, 2000, 6 pages.
Dots and Dashes; 1935, vol. 11, No. 9, 4 pages.
FDR to Offer HNC Software's Real-Time Fraud Detection: New distribution Agreement to Benefit Card Banks; 1996, First Data Resources News Release, 3 pages.
Federal Benefits Checks are Going Away-Don't Let Your Customers Go with Them: Announcing the Western Union Benefits Quick Cash Program; 4 pages.
First Data Aligns with CyberCash to Offer New Electronic Coin Service; 1996, First Data Corporation News Release, 3 pages.
First Data and Netscape Announce Program to Help Businesses Establish Payment-Enabled Web Sites; 1996, First Data Corporation News Release, 5 pages.
First Data and Netscape Offering Internet Payment Processing Service; 1996, First Data Corporation News Release, 3 pages.
First Data InfoSource Offers Database Analysis with DecisionScope; 1996, First Data Corporation News Release, 2 pages.
First Data to Offer Card Profitability Software from HNC: Distribution Agreement Poised to Repeat Falcon Success;1996, HNC Software, Inc. News Release, 3 pages.
First Data, First USA Paymentech, GE Capital Invest in First Virtual Holdings; 1996, First Virtual Holdings Corporation News Release, 3 pages.
First located example of a money transfer; Aug. 25, 1873, 1 page.
Get your Collect Card; 1939, Dots and Dashes, 2 pages.
Guess What? The check's not in the mail; 2001, Western Union's Professional Collector, 3 pages.
Hoffman, Karen Epper "PayPal Still Running Free, But the e-payments company's carefree days may be numbered if regulators decide it's essentially a bank" Bank Technology News, published between 2001-2003, www.banktechnews.com/btn/articles/btnoct01-13.shtml, 3 pages.
How money by phone was paid; Money Transfer Service: Book of Rules and List of Offices; 1926, Western Union Telegraph Company, 3 pages.
Idealab company PayMecom printed date Feb. 16, 2000, 7 pages.
If you're not getting your payment with Quick Collect, chances are you're not getting it; 2001, 2 pages.
Intell-A-Check Corp-http://www.icheck.com web site, printed date Feb. 7, 2000, 7 Pages.
Internet Article, "Send Money by Credit Card" available on Sep. 7, 2007 at http://www.moneytransfer.ie and copyright 2003.
Internet Article, "Western Union Money Transfer" available on Sep. 7, 2007 at http://www.moneytransfer.ie/SendReceive.htm and copyright 2003.
Introducing the Western Union Cash Card Program; 1998, 2 pages.
It takes a certain person to make a good collector. But it takes a good manager to make a champion; 2001, Western Union's Professional Collector, 3 pages.
Lan Airline Alliance Carriers and Western Union Offer Travelers Additional Payment Options; 2005, 3 pages.
Last of the Pony Express Riders Tells His Story; 1932, Dots and Dashes, vol. 8, No. 10, 2 pages.
Latour, Almar "PayPal Electronic Plan May be On the Money in Years to Come", The Wall Street Journal Interactive Edition, Nov. 15, 1999, downloaded from www.paypal.com/html/wsj.html, 2 pages.
Lawton, George; "Biometrics: A New Era in Security"; 1998, Computer, vol. 31, No. 8, pp. 16-18.

Leading Provider of Transaction Card Processing Selects Connect Oneserver Software as a Solution, http://www.oneserver.com web site, May 17, 1996, 5 pages.
Levin, Gary; "Western Union not fading into sunset; new services are added as telegrams drop"; 1992, 2 pages.
List of Prepaid Services; http://www.westernunion.com/info/osComparePrePaid.asp, 1 page.
Loved one stranded? Send Cash; 1991, Akron Beacon Journal, 2 pages.
Luxury Brands LLC: World Famous Brands at Liquidation Process; http://www.auctionbytes.com/cab/pages/payment, 3 pages.
McEnaney, McEnaney, "Modular ATM Gives Boost to Diebold", -DIALCG File 01896530-Akron Beacon Journal—Jul. 12, 1997—3 Pages.
Messenger Work Full of Adventure, Excitement; 1933, Dots and Dashes, vol. 9, No. 11, 2 pages.
Money Order with confirmation; 1948, 1 page.
Money Orders by Phone; 1935, Fortune Magazine, 3 pages.
MoneyZap.com Greeting Card Process Flow; 2000, 2 pages.
Nation Receives Time Over Western Union Network; 1931, Dots and Dashes, vol. 7, No. 5, 2 pages.
Nationwide Credit Collectors Act Globally; 2001, Western Union's Professional Collector, 3 pages.
Netscape Announces Netscape Livepayment to Facilitate Internet Commerce, May 13, 1996, 5 pages.
New Western Union SwiftPay Service Continues Expansion of Consumer to Business Payment Option, PR Newswire Association, Inc., Oct. 29, 1999 2 pages.
NTS Completes Merger with EDS Fleet Services; New First Data Unit Sets Sights on New Markets; 1996, NTS Press Release, 3 pages.
Only Western Union, no date, 2 pages.
PayPal for the Palm; http://handheldnews.com/file.asp?ObjectID=5401, Printed date Oct. 10, 2003; 2 pages.
PayPal.com Case Study; http://fox.rollins.edu/~slackman/PayPal.htm, 2003, 7 pages.
PayPal: The way to send and receive money online; 2002; 4 pages.
PayPal-News; http://www.ndrys.com/paypal.html, 2003, 3 pages.
PaySys—company overview, no date, 2 pages.
PaySys signs up four Asian distributors; 1997 Orlando Business Journal, 3 pages.
Picture of Bill payment form or advertisement, no date, 1 page.
Pilgrims Started Thanksgiving Custom; Dots and Dashes, vol. 4, No. 11, Nov. 1928, 2 pages.
Plotkin, Hal "Beam Me Up Some Cash" Silicon Valley Insider, Sep. 8, 1999, www.halplotkin.com/cnbcs029.htm, 3 pages.
PR Newswire Association, Inc.—Western Union Financial Services forms—Aug. 22, 1991, 1 page.
PR Newswire, "GiftSpot.com Simplifies Gift-Giving on the Internet," Oct. 20, 1999(abstract), [online] retrieved on May 1, 2002], retrieved from Proquest Database, 5 pages.
Press Release: "Western Union Announces ATM Card Payout for Money Transfer Transactions"; 2001, URL: http://news.firstdata.com/media/ReleaseDetail.cfm?ReleaseID=849995>.
Products and Services for PaySys, no date, 2 pages.
Purchasing American Airlines Tickets Just Got Easier; 2005, 4 pages.
Quick Cash and Quick Collect: Western Union's money-movers; 1990, Newsbriefs, vol. 2, No. 1, 3 pages.
Quick Cash: A safe and reliable way to send funds around the world; http://www.payment-solutions.com/quickcash.html, 1 page.
Quick Collect Sales Presentation; Jan. 2004, 28 pages.
Quick Collect: Government/Child Support Agency Name, Training Guide; 2004, 7 pages.
Quick Collect; Western Union Training Guide; 2004, 10 pages.
Quick Pay: The Convenient and reliable way to receive payments from customers worldwide; http://www.payment-solutions.com/quickpay.html, 2005, 3 pages.
Refund of Money Transfers; 1913, Journal of the Telegraph, 2 pages.
Remittance for order sent via Western Union; 1933, 2 pages.
Reynolds Arcade was Western Union Birthplace; 1933, Dots and Dashes, vol. 9, No. 8, 2 pages.
Rhode Island becomes first state to accept child support payments at Western Union: Government Payment Leader govONE Solutions Adds Walk-in to Full Suite of Payment Options; 2002, 3 pages.

Rhode Island becomes first state to accept child support payments at Western Union: More than 50 Western Union Convenience Pay Agent Locations Offer New Level of Convenience to Rhode Island Residents Who Pay Child Support—; 2002, 3 pages.

SBC Communications adds Western Union Locations for Walk-in Customer Bill Payments; SBC News Release, Sep. 7, 2005, 2 pages.

Seifert—Method & System for Electronic Transfer—FDC 0167PUS—21 pages.

Send your payment using Western Union Quick Collect; Feb. 2, 2004 2 pages.

Send Your Utility Bill Payment from Here!; no date 3 pages.

Sending Cash in a Flash: There are more ways to do it than you might think; 1991, 2 pages.

Sending Cash in a Flash; 1990, Travel & Leisure, p. 42.

Shopping Order service and gift service; 1934, Western Union Telegraph Company, Money Order Book, 6 pages.

Signature Services: Helping financial institutions send funds faster; http://www.payment-solutions.com/signature.html, 205, 1 page.

State of Hawaii to Accept Child Support Payments at Western Union; 2004, 2 pages.

State of New York Banking Department: Staff Letters and Memoranda; 2000, http://www.banking.state.ny.us/lo000718.htm, 2 pages.

Steiner, Ina "PayPal Online Payment Service—Another Way to Pay for Auction Items" www.auctionbytes.com, Feb. 20, 2000, 4 pages.

Steiner, Ina: "Accepting Credit Cards When You Sell Items: ProPay and Billpoint Payment Services"; 2000 Auction Bytes, 4 pages.

Steiner, Ina: "BidPay.com Offers Click and Pay Service for buyers"; 2000, Auction Bytes, 4 pages.

Steiner, Ina: "Follow-up to BidPay Article"; 2000, Auction Bytes, 3 pages.

Stoutenburg—Method & System for Performing Money Transfer Transactions—U.S. Appl. No. 10/289,802—30 Pages.

Survey of services; 1960, pp. 2-31.

The Western Union Telegraph Company: Delivery of Money Transfer Service; Apr. 1926, Commercial Bulletin No. 9-A pp. 4.

The Western Union Telegraph Company: Instructions for Receiving Clerks; 1929, Commercial Bulletin No. 37-A, 2 pages.

The Yellow Blank is Correct for every social need; 1930, Western Union Booklet, 2 pages.

The Yellow Blank: When, Why, How to Use It; 1934, 5 pages.

To send a Quick Collect Payment; sample form, no date, 1 page.

Towson, MD., "VIPS Introduces MCSource to Managed Healthcare Industry", VIPS Healthcare Information Solutions, Mar. 7, 1996, 3 pages.

Transfers require ID made by telegraph; 1895, Tariff Book, 4 pages.

Transpoint, "The Way to Pay Online", downloaded from website http://www.transpoint.com/ on Feb. 10, 2000, 12 pages.

Tranz 330 Fast, "Low-Cost Transaction Automation At The Point Of Service," http://www.vfi-finance.com/tranz330.htm, VeriFone Finance, pp. 1-3, especially pp. 1-2, Jan. 1999.

VeriFone Finance, "Fast,Low-Cost Transaction Automation at the Point of Service", Jan. 1999—2 pages.

VisionPLUS Consumer Payment Solution Overview, no date, 2 pages.

Wermer, Sandra; "A million credit card transactions in five hours"; 1997, Primeur, 2 pages.

Western Union—Quarterly Report 3rd Quarter 1975—4 pages.

Western Union—Some Quick Facts about Quick Collect; no date, p. 1.

Western Union—"Now, using our service is even more rewarding" 4 pages.

Western Union and Continental Airlines Introduce New Quick and Easy Cash Payment Option When Booking Flights; 2004, Press Release, 4 pages.

Western Union Creates Phone Card with BLT Technologies; 1997, PR Newswire Association, 2 pages.

Western Union Financial Services, Inc.: Benefits Quick Cash Agreement and Disclosure Statement; 1998, 2 pages.

Western Union Financial Services, Inc.: Cash Card Agreement and Disclosure Statement; 1998, 2 pages.

Western Union Gift Greetings; no date, 6 pages.

Western Union Hotel-Motel Reservation Service, no date, 1 page.

Western Union Money Orders More Popular Than Ever: 1942, Dots and Dashes, vol. 18, No. 3, 2 pages.

Western Union Money Transfer & more—9 pages.

Western Union—Money Transfer Service—Feb. 1, 1920 10th Edi—pp. 119 & 120.

Western Union Money Transfer Services, Send Money Online, Money Orders, Printed date Nov. 3, 2005, 3 pages.

Western Union New Supplement: Money Orders delivery through Mailgram: 1975, 2 pages.

Western Union News Supplement: Automatic travelers checks using Western Union; 1975, 2 pages.

Western Union Payment Services, Bidpay and Quick Collect, Online Bill Payment, Online Auction Payments; http://www.westernunion.com/info/osComparePayment.asp, 2005, 2 pages.

Western Union Products and Services: a brief description; 1960, 22 pages.

Western Union Quick Collect, "There's a lot to be said about the many advantages of the Quick Collect service and look who's saying it", 1995, 4 pages.

Western Union Quick Collect: First Data Corporation; 2000-2001,2004; 2 pages.

Western Union Quick Collect: The Fastest way to collect good funds; 1999, 11 pages.

Western Union Quick Collect: The most agents, the most locations, the most experienced; 2000, 2 pages.

Western Union Quick Collect; 3 Easy Ways to Send a Payment: In Person, Online or by Phone!; no date, 2 pages.

Western Union Some Quick Facts about Quick Collect, https://quickfind,Westernunion.com., p. 1.

Western Union SwiftPay Selected by Sheakley Uniservice to Complete W-2 Reprint Transactions; 2000, PR Newswire Association, 2 pages.

Western Union Telegraph Company; 1933, Money Order Message, 17 pages.

Western Union/Money Zap: Send and receive money easily over the Internet; http://www.moneyzap.com/main.asp, printed Dec. 1, 2000, 23 pages.

Western Union's Would-Be Rival; 1990, American Banker, 1 page.

Westwood, Mass, "Strean, LitleNet, BBN, and KPMG Announce Industry-Wide Initiative to Enable Wide-Scale Software Electronic Commerce" Stream International Inc., and LitleNet, May 7, 1996, 7 pages.

When you're helping a customer make a crucial payment there's no room for guesswork; 2002, Western Union's Professional Collector, 3 pages.

Why Send Your Customers Across Town When You Can Send Them Next Door? 2005, 1 page.

Wijnen, Rene "You've Got Money!", Bank Technology News, Jun. 2000, pp. 1-4, vol. 13, Issue 6, New York.

x.com, "Do More with Your Money," download from website http://www.x.com., 5 pages, Feb. 7, 2000.

XP-002347909-Western Union Announces ATM Card Payout for Money Transfer Transactions—Oct. 22, 2001 p. 1.

You're sending more than a payment: Point-of-Sale & Merchandising Support Advertising Materials, no date, 2 pages.

You're sending more than a payment: You're sending peace of mind; 2004, 3 pages.

Greenia, Mark, "Lexikon's History Of Computing," downloaded from http://www.computermuseum.li/Testpage/01HISTORYCD-Glossary.htm on Nov. 10, 2005, Lexikon Services, 3 pages, 1982, 2002-2003.

Stockel, Anna, "Securing Data And Financial Transactions," IEEE, pp. 397-401, 1995.

Western Union, "Shopping Order," 2 pages, 1933.

Western Union Corporation, "First Quarter Report," Stockholder News And Annual Meeting Report, 2 pages, Spring 1978.

* cited by examiner

110 — Name #1:_____ Phone 1:_____
Phone 2:_____
Address #1:_____ Email:_____
_____ SSN:_____
_____ DOB:_____
Drivers Lic:_____

120 — Name #2:_____ Phone 1:_____
Phone 2:_____
Address #2:_____ Email:_____
_____ SSN:_____
_____ DOB:_____
Drivers Lic:_____

Transaction Pair Code(s)       Transfer Amount
    12345678-A
    12345678-B                    _____

IN-LANE MONEY TRANSFER SYSTEMS AND METHODS

CROSS REFERENCE TO RELATED APPLICATIONS

This application is a continuation of U.S. patent application Ser. No. 11/132,725, filed May 18, 2005, the complete disclosure of which is incorporated herein by reference.

BACKGROUND OF THE INVENTION

The present invention relates generally to the field of money transfers, and in particular to the transfer of money between two frequent entities or customers which may occur using point-of-sale systems to initiate or facilitate the transfer.

Present money transfer procedures typically involve an individual going to a money transfer location, such as a Western Union location, and giving the customer service agent a variety of personal information. This personal information may include the names and addresses of the sender and recipient, proof of identification, and the amount to be transferred. This information is entered into a money transfer system, and used to create a record of the money transfer. Once the money to be transferred has been collected from the sender, the recipient then proceeds to a separate money transfer location, such as another Western Union location, to pick up the money. The recipient may be required to provide a money transfer number and/or proof of identification, prior to picking up the money. Typically, this procedure is followed for each subsequent money transfer, even when the sender and recipient are the same. As a result, people who frequently send money using money transfer systems are repeatedly providing much of the same information. Improvements are desired.

BRIEF SUMMARY OF THE INVENTION

The present invention relates generally to the field of money transfers, and in particular to the transfer of money between two frequent entities or customers which may occur using point-of-sale systems to initiate or facilitate the transfer. The present invention provides systems and methods to initiate, facilitate, process and/or perform money transfers. In one such embodiment, a method of processing money transfers includes receiving a request for a transfer pair verification from a vendor location, and verifying that the transfer pair is associated with a valid transfer pair record. The method includes sending the transfer pair verification to the vendor location, receiving a money transfer request associated with the transfer pair from the vendor location, and authorizing a money transfer to at least one of a first and second customers associated with the transfer pair. In this manner, a vendor location, which may include a point-of-sale device and may be a retail outlet (e.g., grocery store, gas station, or the like), can be used to facilitate a money transfer between two customers who have an established transfer pair record.

In one aspect, the method further includes establishing the transfer pair record associated with the first customer and the second customer. The transfer pair record may be established, for example, by verifying the identity of at least one of the first and second customers, receiving first and second customer information and creating a database record thereof, and providing a transfer pair code to at least one of the first and second customers. In some aspects, the transfer pair code is a string of alphanumeric characters. The transfer pair code also may include a money transfer recipient designator. For example, the code may have a prefix or suffix to indicate which of the two customers involved in the money transfer is the recipient.

In one aspect, the method includes sending a fee request to the vendor location. This may occur, for example, when the transfer pair verification is sent to the vendor location. The fee request may be a money transfer fee to be charged the customer initiating the money transfer. The fee may be a fixed fee (e.g., a set dollar amount per money transfer), or a variable fee (e.g., a percentage of the dollar amount being transferred).

In some aspects, the method includes receiving a payment record corresponding to the money transfer request. The payment record may be created by a point-of-sale device or a computer system associated with the vendor location. The payment record may indicate the amount to be transferred as requested by the customer. In other aspects, the transfer amount is fixed, and the record of this amount may further be stored in the transfer pair record. This feature may be useful, for example, if a customer wants to send a same amount each week, each pay period, each month, or the like.

The money associated with the money transfer request is dispensed to the first or second customer in some aspects. The dispensing may involve receiving a transfer pair code associated with the transfer pair from the first or second customer prior to the dispensing of the money. In this manner, the intended recipient provides the transfer pair code, and possibly other proof of identity, prior to receiving the transferred money.

The present invention further provides methods of facilitating money transfers by a customer. One such method includes receiving a money transfer request and a transfer pair code from a first customer. A request for a transfer pair verification is sent to a host computer, and the transfer pair verification is received from the host computer. If the verification is not received, in some aspects the money transfer request is denied. Alternatively, the money transfer may proceed after customer information is collected. The method includes receiving a payment from the first customer for transfer to a second customer associated with the transfer pair code, and sending a record of the money transfer request and the payment to the host computer. In some aspects, a receipt is provided to the first customer. In some aspects, at least a portion of the transfer occurs using a point-of-sale device or system. In other embodiments, some or all of the transaction occurs using a website interface, a voice recognition unit, a customer service representative, or the like. In this manner, transactions may occur between pre-registered entities (e.g., utility companies or other service providers), and/or between pre-registered customers (e.g., an individual), or some combination thereof, without needing to collect large amounts of data or information for each transaction.

Methods of the present invention will be particularly useful for initiating money transfers "in-lane," such as while shopping at a retail outlet. In one aspect, the method further includes receiving a purchase request for a consumer item from the first customer. The payment includes a first payment portion associated with the consumer item and a second payment portion associated with the money transfer request. In some aspects, the payment further includes a third payment portion associated with a money transfer fee. In this manner, the customer can initiate the money transfer while attending to other shopping or errands, or while at a location not designated solely for money transfers. The use of a transfer pair, particularly a transfer pair previously established by the first and/or second customer, will reduce or eliminate the amount of personal information that otherwise would need to be collected prior to the money transfer. In some embodiments, the initiating customer need only provide the transfer pair and an amount to be transferred.

The present invention further provides systems to initiate, perform, process or otherwise facilitate money transfers. One such system includes a host computer having a processor coupled to a database. The host computer further includes code for performing various methods of the present invention. In one particular embodiment, the host computer includes code for receiving a request to verify a transfer pair from a point-of-sale device, code for verifying if the transfer pair is associated with a valid transfer pair record, and code for sending a transfer pair verification to the point-of-sale device. The host computer further includes code for receiving a money transfer request associated with the transfer pair from the point-of-sale device, and code for authorizing a money transfer to at least one of a first customer and a second customer associated with the transfer pair. In this manner, the money transfer may be initiated at a remote location, such as at a point-of-sale device. In some embodiments, the system includes the point-of-sale device.

In some aspects, the system further includes code for establishing the transfer pair record associated with the first customer and the second customer. The record may be established using code for receiving first and second customer information and creating a database record thereof to include a transfer pair code. The transfer code then is provided to at least one of the first and second customers.

Other objects, features and advantages of the present invention will become more fully apparent from the following detailed description, the appended claims, and the accompanying drawings.

BRIEF DESCRIPTION OF THE DRAWINGS

FIG. 1 is a simplified depiction of a transfer pair record according to an embodiment the present invention;

DETAILED DESCRIPTION OF THE INVENTION

Figure 2:
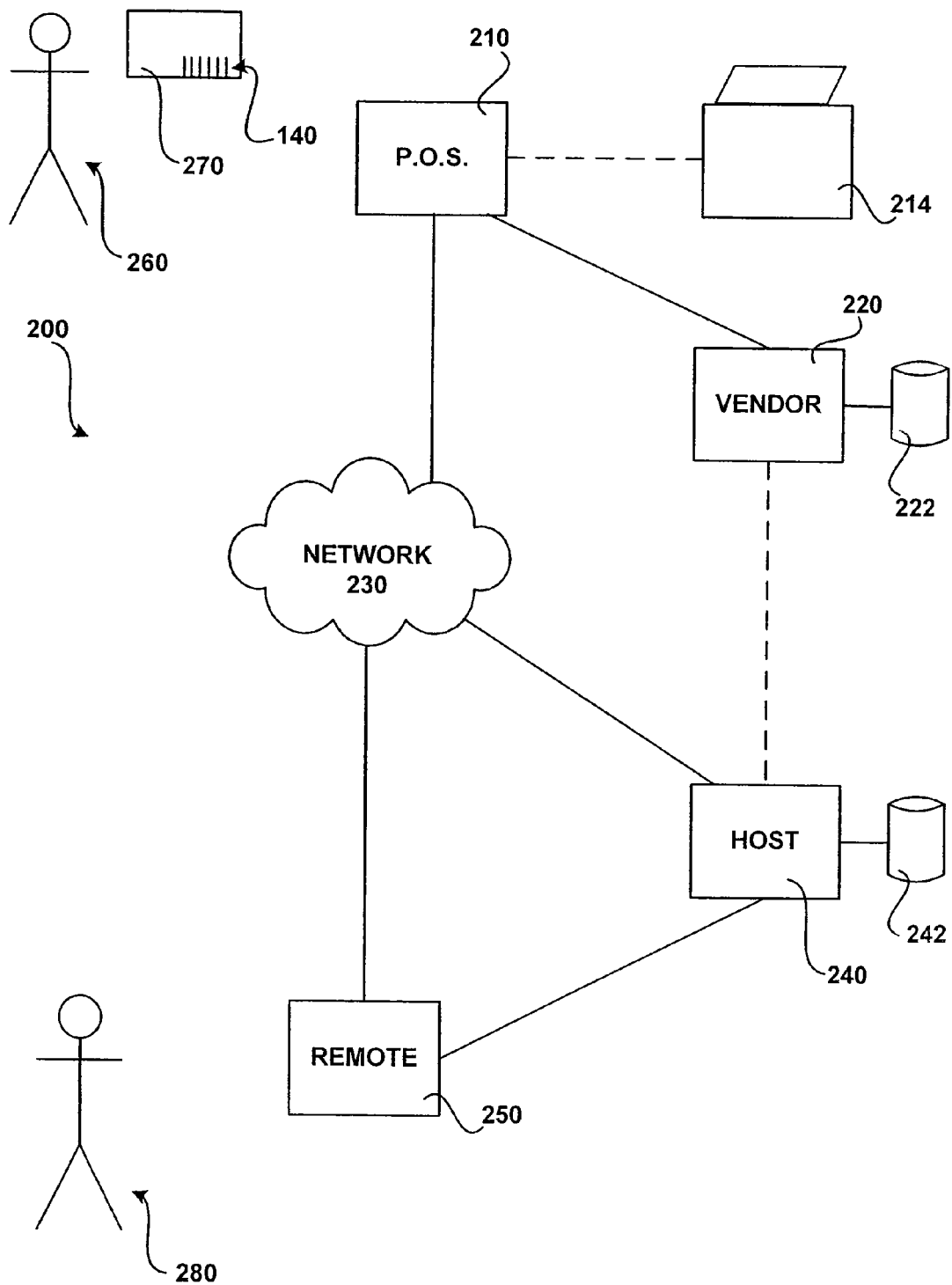
FIG. 2 is a simplified schematic system for facilitating money transfers according to an embodiment of the present invention.

The present invention includes systems and methods that initiate, facilitate, process and/or perform money transfers or other recurring financial transactions between two parties, entities, or customers. The embodiments of the present invention will be particularly useful for customers who commonly send money to the same one or few number of recipients. For example, legal aliens working within the United States may use a money transfer system to send money back to their family in Mexico, or South or Central American countries. These money transfers may occur at fairly regular intervals, and may, for example, correspond to times at which the workers are paid by their employers. Some embodiments of the present invention will be particularly useful to reduce the amount of information these customers must provide each time they desire to send money. Further, the number of locations at which a money transfer can be initiated are increased through use of the systems and methods of the present invention.

In some embodiments, a transfer pair record 100 is created for a pair of customers. As shown in FIG. 1, in one embodiment transfer pair record 100 includes information on a first customer 110 and information on a second customer 120. The information includes the customers' names and addresses. Transfer pair record 100 may further include additional details on customers 110, 120 including, but not limited to, telephone numbers, cell phone numbers, email addresses, social security numbers, dates of birth, driver license numbers, employee identification numbers, passwords, credit card information, bank account information, information on other payment mechanisms, and the like. FIG. 1 depicts similar information for first customer 110 and second customer 120 within transfer pair record 100. In other embodiments, the amount of information for first and second customers 110, 120 may differ. For example, if second customer 120 is always going to be the money transfer recipient, the amount of information may be more or less than collected for first customer 110. Further, not all customers will have the same amount of personal information. For example, customers 110 and/or 120 may not have a valid driver's license, a U.S. Social Security number, an email address, or the like. Transfer pair record 100 will be particularly useful for first and second customers 110, 120 who want to send money to each other, or from one customer to the other, on more than one occasion.

Transfer pair record 100 is created a number of ways within the scope of the present invention. For example, first customer 110 may enter a money transfer location, such as a Western Union location, and provide relevant information to a customer service representative (CSR) for first customer 110 and second customer 120. This may occur, for example, when first customer 110 is the sender of money for transactions between these two customers. The CSR creates transfer pair record 100 by entering the collected information into a computer-based system having appropriate software. Transfer pair record 100 also may be created by allowing first customer 110 to enter customer information into a website, such as a Western Union website. In other embodiments, customer information is conveyed by telephone to a CSR or an interactive voice response (IVR) system, by mobile or wireless devices, or the like, in order to create transfer pair record 100. The amount of information retrieved from customers 110 and/or 120 may be effected by the Patriot Act, or other federal, state, or local legislation.

In a particular embodiment, first customer 110 and second customer 120 intend to transfer money between them, or from one of them to the other, on a regular or semi-regular basis. In some embodiments, first customer 110 is always the sender of the money and second customer 120 is always the recipient of the money. In other embodiments, second customer 120 sends money on some occasions, such as when they are paying back money loaned to them by first customer 110.

The creation of transfer pair record 100 includes, in one embodiment, the creation of a transfer pair code 140. Transfer pair code 140 may take a number of different forms within the scope of the present invention. As shown in FIG. 1, in one embodiment transfer pair code 140 includes a string of alphanumeric characters. In some embodiments, transfer pair code 140 includes a character, code segment, or the like that operates as a money transfer recipient designator. The designator may be a prefix and/or a suffix that is used to designate which of customers 110, 120 is sending the money and which is receiving it. For example, as shown in FIG. 1, the suffix "-A" may indicate that first customer 110 is sending money to second customer 120, while the suffix "-B" may indicate money is being transferred from second customer 120 to first customer 110. In other embodiments, transfer pair code 140 is completely different depending upon which of the customers 110, 120 is the initiator or recipient in the money transfer. In some embodiments, transfer pair codes 140 take alternative forms other than a string of alphanumeric characters. For example, transfer pair codes 140 may be embodied in a universal product code (UPC) that is sent or provided to customers 110 and/or 120.

In some embodiments, it may be desirable for first customer 110 to send a prescribed amount of money to second customer 120. In this embodiment, transfer pair record 100 includes a transfer amount 130. This embodiment will be useful, for example, when first customer 110 wants to be sure they send the necessary amount to second customer 120. In other embodiments, the amount of each money transfer can vary. In one such embodiment, the variable amount is not maintained in transfer pair record 100. In another embodiment, a history of the transfers between first and second customers 110, 120 are maintained in transfer pair record 100.

While transfer pair record 100 is shown pairing two customers 110, 120, in some embodiments transfer pair record 100 is created for use with money transfers between more than two customers. For example, transfer pair record 100 may include information on a third customer, and may include additional transfer pair codes for the transfer of money to and/or from the third customer to first customer 110 and/or second customer 120. This embodiment may be useful, for example, if first customer 110 is a parent with two children in college. In this example, first customer 110 wishes to send money to their children (e.g., second customer 120 and third customer) at different points in time, at different locations (e.g., at different schools), in different amounts, and the like. In an alternative example, the third customer operates as a proxy for the second customer. For example, the second (money receiving) customer may be an elderly parent, with the third customer being their son or daughter. The son or daughter may be authorized to receive the money on the parent's behalf in certain prescribed situations (e.g., when the parent is ill) or, alternatively, in all circumstances. In this example, the third customer (son or daughter) also is registered, with the transfer pair record having information on the third customer.

In another embodiment, a "batch" of transactions may occur. For example, when a first customer receives their paycheck, they may want to send X dollars to their mother, Y dollars to their sister and Z dollars to their brother. A transaction record is created for this group of parties, so that each time the record identifier is used the above transactions occur. In some embodiments, the transaction record identifies the amounts and recipients as previously described. In other embodiments, the amount to be sent is calculated on a percentage basis. For example, the first customer may identify the total amount to be transferred, and the transaction record contains information that the mother receives, for example, fifty percent (50%), and each of the siblings is to receive twenty-five percent (25%) of the transfer amount. In other embodiments, the appropriate transaction fees are removed prior to distribution of the funds. In other embodiments, the amounts can be dynamically managed, such as by electronic means (e.g., the Internet) to adjust the amounts, percentages, or the like. In some cases, if the first customer wants to send money only to their mother, a separate transaction pair for the first customer and mother is created if the customer desires recurring transfers.

In a preferred embodiment, the creation of transfer pair record 100 produces one or more transfer pair codes 140 that are unique to first customer 110 and second customer 120 associated with transfer pair record 100. Transfer pair codes 140 are then provided to one or both customers 110, 120. Providing transfer pair codes 140 to customers 110, 120 occurs through a variety of mechanisms within the scope of the present invention. For example, transfer pair code 140 may be provided to first customer 110 when they create transfer pair record 100. In another embodiment, transfer pair codes 140 are mailed to one or both customers 110, 120 in a fashion similar to the mailing of a personal identification number (PIN) commonly used with automated teller machine (ATM) cards. In another embodiment, transfer pair codes 140 are emailed to customers 110, 120 using, for example, the email addresses entered into transfer pair record 100. In still another embodiment, transfer pair codes 140 are embodied or printed on a presentation device, such as a card or the like. The presentation device is sent or provided to customers 110, 120. In one embodiment, the presentation device is a card containing a magnetic stripe. Transfer pair code(s) 140 may be encoded in the magnetic stripe along with, in some embodiments, additional information from transfer pair record 100. Customers 110, 120 can use the presentation device when they send or receive money as further described below. It will be appreciated by those skilled in the art that the form of transfer pair code 140 and the method at which transfer pair codes 140 are provided to customers 110 and/or 120 may vary within the scope of the present invention beyond the above specific examples.

Once transfer pair record 100 has been established, transfer pair code 140 can be used to initiate money transfers from a variety of locations. In some embodiments, customer 110 or 120 initiates the money transfer by logging onto a money transfer organization website, such as the Western Union website. Transfer pair code 140 is entered into the website so that the Western Union money transfer system accesses transfer pair record 100 associated with the appropriate customers 110, 120. In this embodiment, the website may prompt the customer to provide further information such as a date of birth, a driver's license number, a password, or the like, to verify that the individual interfacing with the website is indeed one of first or second customers 110, 120. The initiation of money transfers using transfer pair code 140 also may occur by telephone, by interfacing with an IVR system, or the like. For example, first customer 110 may call a customer service representative (CSR) associated with the organization facilitating the money transfers (e.g., Western Union). First customer 110 provides the CSR with transfer pair code 140, a transfer amount (if the transfer pair allows variable amounts), and a payment method. In some embodiments, additional authorization also is provided (e.g., a password or other information in transfer pair record 100) by first customer 110. In some embodiments, the acceptable payment method is limited to payment methods already identified in transfer pair record 140 (e.g., a credit card account, Paypal account, etc.). In some embodiments, a receipt for the transaction is provided to first customer 110, such as by email, voice message, paper receipt mailed to first customer 110's address, or the like. A particular advantage of the present invention further includes the use of transfer pair codes 140 while customers 110 and/or 120 are at a retail location as will be further described in conjunction with subsequent figures.

Turning now to FIG. 2, a system 200 for initiating, facilitating, processing and/or performing money transfers according to embodiments of the present invention will be described. System 200 includes a host computer system 240 coupled to a database 242. In one embodiment, host system 240 comprises a server or other computer based apparatus for creating and maintaining records associated with money transfers. Host computer system 240, in one embodiment, is operated by a third party such as Western Union or another money transfer organization. Database 242 maintains records of money transfers. Further, in one embodiment, database 242 maintains some or all transfer pair records 100. For example, host computer system 240 may comprise or be coupled to a server maintaining a Western Union website into which first customer 110 inputs data to create transfer pair record 100. Similarly, host computer system 240 may have other user interfaces by which a customer service representative enters data and creates transfer pair records 100. Further, host computer system 240 may include or be coupled to an interactive voice response system to allow customer 110 to interface with system 240 to create transfer pair records 100.

In one embodiment, a transfer pair record has been created for a first customer 260 and a second customer 280. In this embodiment, second customer 280 is the intended recipient of a money transfer initiated by first customer 260. In order to receive the money, second customer 280 goes to a remote terminal or system 250. Remote system 250 may be a kiosk, a money transfer location such as a Western Union location, or the like. In alternative embodiments, the transferred money is deposited into a permanent or temporary account for second customer 280, such as a bank account, a stored value account, or the like. In one embodiment, remote system 250 also comprises a computer system, associated databases (not shown), and other necessary hardware and software in order to help coordinate the money transfers for customers 260 and 280. In one embodiment, remote computer system 250 is coupled to host computer system 240 so that database records maintained in database 242 are accessible by remote computer 250. This coupling between remote system 250 and host computer system 240 may be a direct coupling or may be a coupling through a network 230 as depicted in FIG. 2. Network 230 may include telephone networks, credit card networks, wide area networks, the Internet, wireless networks, and the like. Further, depending on the type of processing device used to transmit the information, such devices may also be coupled to a financial network such as a credit card network or Automated Teller Machine (ATM) network, or may have a direct connection to other host computer systems.

While host computer system 240 is depicted as a single system, host computer system 240 may have multiple components and may comprise a collection of more than one system. For example, money transfer records may be maintained in a first portion of host computer system 240, while transfer pair records 100 may be maintained in a second portion of host computer system 240. Multiple databases 242 also may be used to facilitate the storage and retrieval of transfer pair records 100.

In some embodiments, portions of system 200 are found in retail outlets, such as grocery stores, gas stations, and the like. In one embodiment, a retail outlet has an associated vendor system 220 coupled to a database 222. Vendor system 220 also is coupled to a point-of-sale (POS) device or terminal 210. In some embodiments, POS device 210 is a point-of-service, such as a location at which the customer receives some service or benefit as opposed to making physical purchases. The coupling between vendor system 220 and terminal 210 may be a direct coupling, or may be an electronic coupling through network 230. A direct coupling between vendor system 220 and point-of-sale device 210 may comprise, for example, a point-of-sale terminal 210 in a store location, physically or wirelessly coupled with vendor system 220. In some embodiments, vendor system 220 comprises a server, a computer, or the like, which may be located in a back room of the store or retail location.

Vendor system 220 and its associated database 222 may contain a wide variety of store-related records. For example, in some embodiments database 222 contains inventory lists, price lists, vendor lists, employee information and the like. In a particular embodiment, point-of-sale device 210 exists in a grocery store having a plurality of items available for consumers to purchase. Typically, such a point-of-sale device forms part of a cash register system in which the customer, or a clerk or employee of the store, scans item UPC's or item information into point-of-sale device 210. Point-of-sale device 210 receives the costs associated with those items from vendor system 220, or alternatively the costs are maintained in POS device 210 by a SKU, etc. Point-of-sale device 210 then accumulates a total cost of all items to be purchased by first customer 260 and presents the total to customer 260. First customer 260 will then tender payment for the desired items and depart the store location. If the payment is rendered using a credit card, a personal check, or the like, a payment authorization process may occur before the customer departs with the desired items. This authorization may involve standard credit card authorization or check authentication as known to those skilled in the art. Customer 260 also may pay by cash, money order, travelers check, or the like.

In some embodiments, vendor system 220 does not reside at a store location, but instead resides at a regional location. For example, a grocery store chain may have a single regional vendor system 220 maintaining records of store inventory, and costs and prices associated with items sold therein. The point-of-sale terminals 210 in one or more store locations are coupled to vendor system 220. In this manner, inventory and prices can be managed on a regional level in addition to a store by store manner. In still another embodiment, vendor system 220 is a third party owned system used to facilitate various transactions. In some cases, vendor system 220 resides at a third party transaction processing facility.

In some embodiments, point-of-sale terminal(s) 210 communicate with vendor system 220 through network 230. Point-of-sale devices 210 that may be used to capture, transmit and/or receive information to and from host computer system 220 for some embodiments of the present invention are further described in copending U.S. application Ser. No. 10/116,689, entitled Systems and Methods for Performing Transactions at a Point-of-Sale, filed Apr. 3, 2002, and assigned to the assignee of the present invention, the complete disclosure of which is herein incorporated by reference.

In some cases first customer 260 purchases items at the store using the above-noted procedure, but also wants to initiate a money transfer to second customer 280. In some embodiments of the present invention, system 200 is adapted to allow first customer 260 to initiate a money transfer at the store location using point-of-sale terminal 210. In a particular embodiment, customer 260 presents a money transfer request to either point-of-sale terminal 210 or a clerk operating point-of-sale terminal 210. In doing so, first customer 260 provides the clerk or POS device 210 with transfer pair code 140 associated with first customer 260 and the correct second customer 280 to whom first customer 260 is sending money. This may be a verbal rendering, from which the clerk or customer 260 will key in the appropriate transfer pair code and/or the requested money transfer amount into point-of-sale terminal 210. In another embodiment, transfer pair code 140 has been printed on a piece of paper and provided to the clerk. The printed paper may be a handwritten transfer pair on a money order request sheet obtained by first customer 260 at the vendor location, an email first customer 260 received from host system 240 which first customer 260 has printed and carried with them to the store, or the like. In another embodiment, the store has a kiosk, a computer, or the like which is coupled to host system 240. In this manner, first customer 260 can retrieve their transfer pair code 140 while at the store for initiating the money transfer. Alternatively, some or all of transfer pair code 140 or other customer account information is maintained on a presentation device 270, such as in a Universal Product Code (UPC). Alternatively, a magnetic strip may be provided on presentation device 270 having transfer pair code 140 and possible additional information as well. Information maintained in UPC, the magnetic strip, written or printed on presentation device 270, or the like, may include the customer name, money transfer amount 130, transfer pair code 140, and the like.

Transfer pair code 140 is entered into POS device 210, and transmitted to host computer 240. Host computer 240 checks the received transfer pair code 140 against transfer pair records 100, including records 100 which may be stored in database 242. In some embodiments, a customer name or other information is sent to host computer 240, and checked against the transfer pair record corresponding to the provided transfer pair code 140. Host system 240 may confirm, for example, that the provided transfer pair 140 corresponds to a valid transfer pair record 100. For a verified transfer pair code 140, host system 240 returns a money transfer authorization or transfer pair code verification to POS device 210. POS device 210, or the clerk operating POS device 210, then proceeds with the money transfer by collecting the money to be transferred from customer 260. For fixed amount transfers, in some embodiments the money transfer authorization may include the money transfer amount. In this manner, POS device 210 is informed of the authorized money transfer it may collect. In other embodiments, the money transfer authorization returns a maximum money transfer amount. In this case, POS device 210 is authorized to accept money transfers up to the maximum authorized amount, but not a greater amount.

In some embodiments, the money transfer amount is collected from customer 260, and any money transfer fees are deducted from the collected amount. In other embodiments, POS device 210 is instructed by host system 240 to collect a money transfer fee in addition to the money transfer amount customer 260 wishes to transmit. In some embodiments, the money transfer fee is a variable amount such as a percentage of the money transfer amount. The collection of the fee would be similar to applying a sales tax to an item being purchased at POS device 210. In other embodiments, the money transfer fee is a fixed amount (e.g., five dollars per transfer). Additional money transfer fees may be used in alternative embodiments, such as a sliding fee scale (e.g., a five dollar fee for every one hundred dollars transferred, with a maximum fee of fifty dollars). In some embodiments, the transfer pair verification response sent to POS device 210 includes the money transfer fee to be collected. In other embodiments, presentation device 270 and/or vendor system 220 maintains a money transfer fee schedule. The money transfer fee may include a fee to be paid the operator of host system 240, and may include a fee to be paid to the operator of vendor system 220.

In one embodiment, host system 240 and associated database 242 maintains some or all of the transfer pair records 100. In this embodiment, point-of-sale terminal 210 communicates via network 230 to host computer 240 in order to facilitate money transfers. In one embodiment, appropriate software is maintained on host computer 240 and/or remote computer 250 or their associated databases 242, to perform the money transfer process. Additional details on some methods according to the present invention will be further described in conjunction with FIGS. 3A and 3B.

When customer 260 tenders payment for items purchased at the store and/or for a money transfer, this payment may require further authorization. For example, if customer 260 is paying with a credit card, a standard credit card authorization may be performed using point-of-sale terminal 210. Similarly, if customer 260 is paying with a personal check, a check authentication process may be performed at point-of-sale terminal 210. In some embodiments, customer 260 will be tendering payment only for the money transfer. In other embodiments, customer 260 will be tendering payment for the money transfer and also additional items purchased at the store location operating point-of-sale terminal 210. In this manner, customer 260 may kill two birds with one stone by, for example, purchasing desired groceries or other items available at a store as well as initiating a money transfer.

In some embodiments, payment received by point-of-sale terminal 210 for money transfers is forwarded to host system 240 using an Automated Clearing House (ACH) system and process, the Western Union Money Transfer System, or another money transfer system. In some embodiments, host computer 240 controls or helps control the ACH process for payments received from customer 260 that are associated with money transfers. In this manner, host computer 240 may control the money transfer process so that money collected by point-of-sale terminal 210 is made available to second customer 280 associated with transfer pair record 100 that they share with first customer 260. Additional details on money transfers for use with the present invention may be found in U.S. application Ser. No. 10/206,661, filed Jul. 26, 2002, entitled Money Transfer Systems and Methods for Travelers, and assigned to the assignee of the present, the complete disclosure of which is herein incorporated by reference.

Figure 3A:
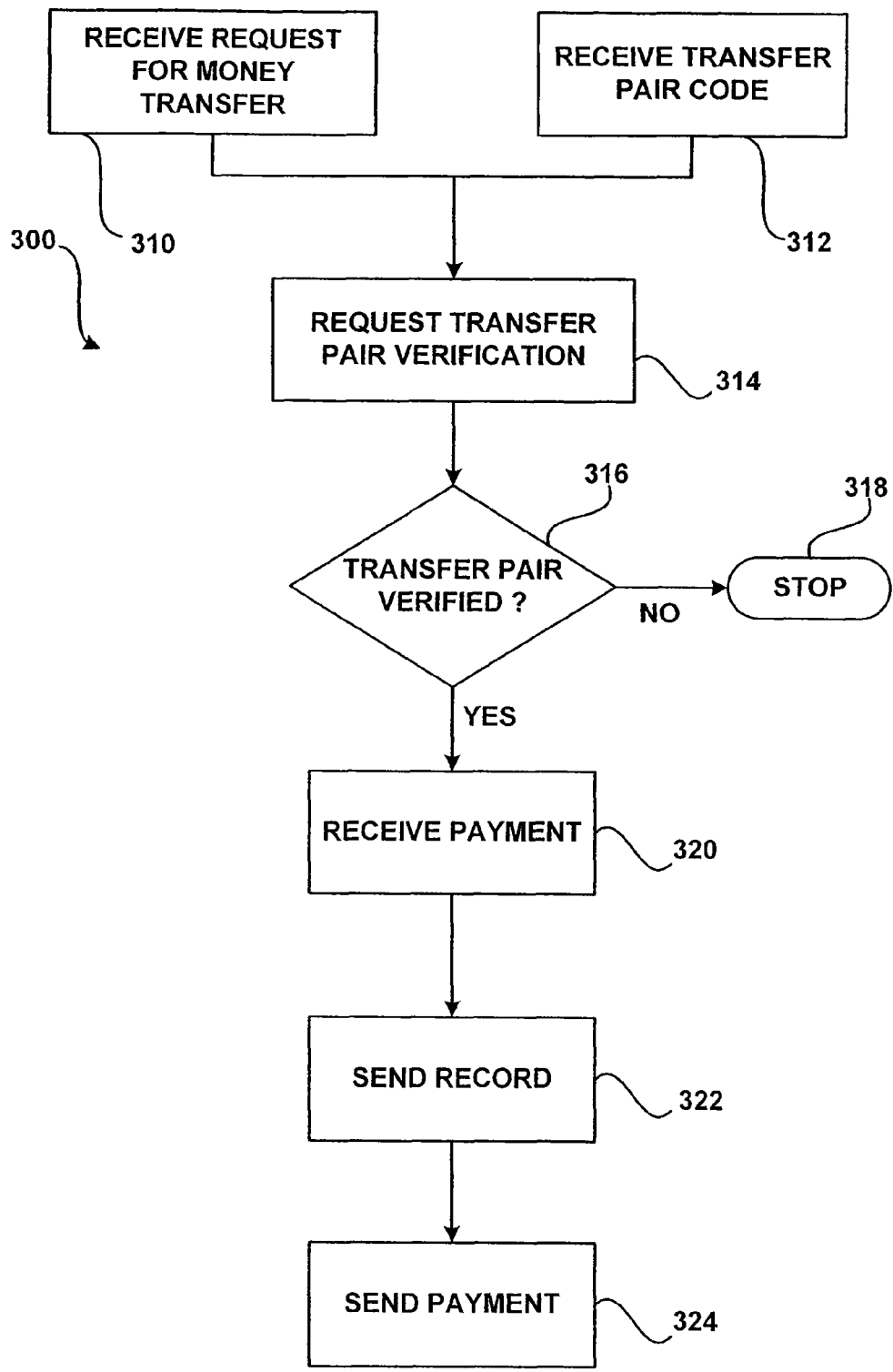
FIGS. 3A and 3B are simplified flow diagrams of methods according to embodiments of the present invention.
Figure 3B:
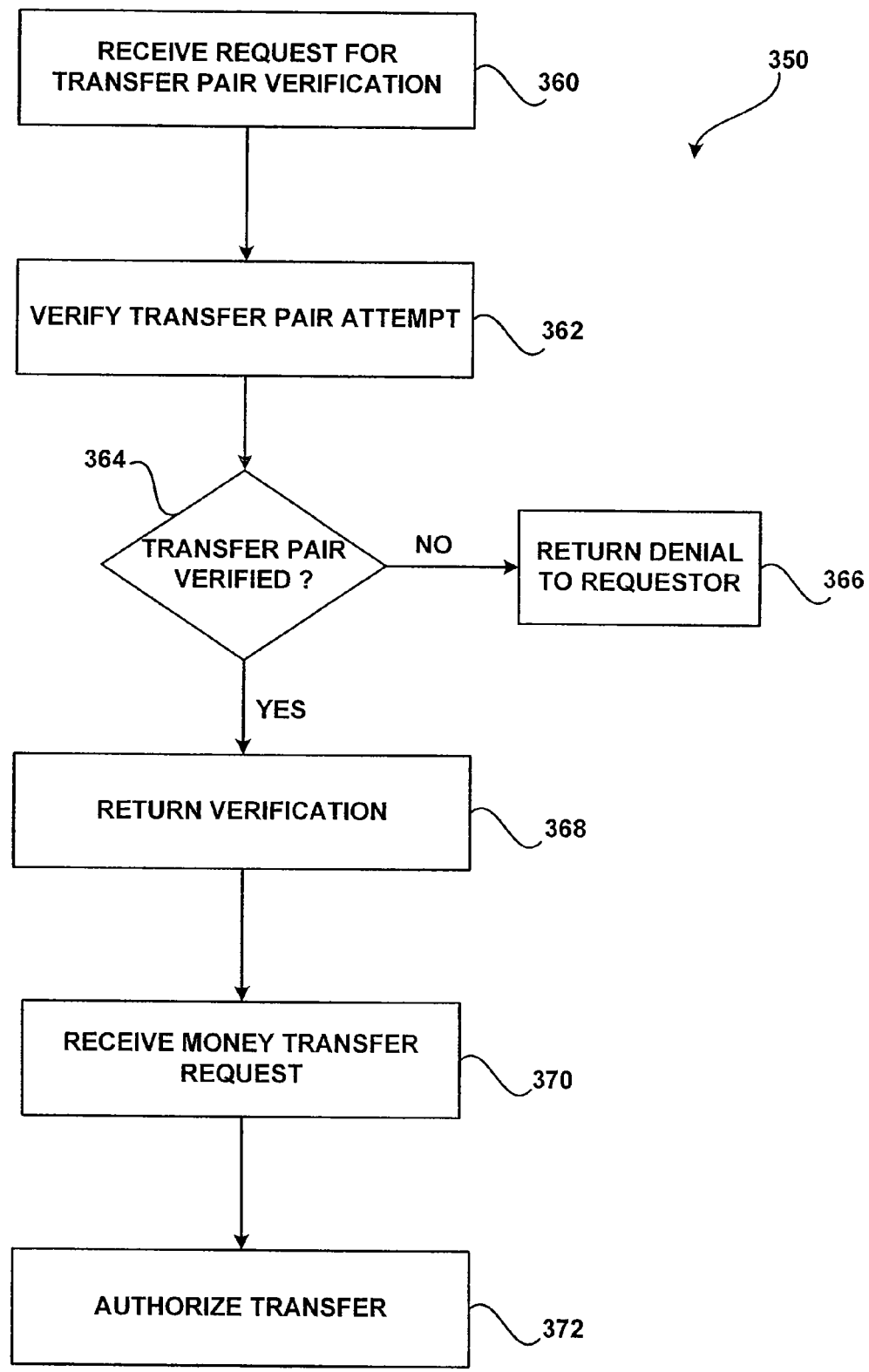

Turning now to FIGS. 3A and 3B, methods of the present invention will be described. In particular, FIG. 3A depicts a method 300 for facilitating a money transfer by a customer. FIG. 3B depicts a method 350 for processing a money transfer. As shown in FIG. 3A, method 300 includes receiving a request for a money transfer (Block 310) and receiving a transfer pair code (Block 312). In some embodiments, receipt of the money transfer request and the transfer pair code occur simultaneously, and in still other embodiments, the receipt of the transfer pair code comprises the money transfer request. The receipt of the money transfer request and transfer pair code may occur according to any of the above described methods. For example, the transfer pair code may be embodied in a UPC or in a magnetic stripe on presentation device 270 that is received by point-of-sale device 210 or a clerk operating point-of-sale device 210. Method 300 includes requesting a verification of the transfer pair (Block 314). This verification request may include point-of-sale device 210 and/or vendor system 220 sending a request to host system 240 to verify the transfer pair. Method 300 includes determining whether the transfer pair has been verified (Decision Block 316). In one embodiment, POS device 210 receives a "YES" verification or a "NO" verification response from host 240. If the transfer pair is not verified, the money transfer request is terminated (Stop 318). If the transfer pair is verified, method 300 includes receiving payment for the money transfer (Block 320). Payment may involve a money transfer customer paying cash, or the like, to POS device 210 or a clerk operating POS device 210.

Receipt of payment may further include receiving payment of a money transfer fee. In some embodiments, the money transfer fee is deducted from the money transfer amount requested. In other embodiments, the customer initiating the transfer pays the amount they desire to transfer to the recipient, and also pays a money transfer fee. Thus, receiving payment may have multiple components. Payment may also include a payment portion for the customer's purchase of various consumer items or services at a retail location operating POS device 210. Method 300 includes sending a record that the money transfer has been successfully initiated and that the money has been collected (Block 322). Again, point-of-sale device 210 and/or vendor system 220 may send the record to host computer system 240. Database 222 may store a record of the money transfer request being processed. Method 300 includes sending of the payment (Block 324), which may include the actual transmission of money, or the transmission of payment records through an ACH or other system. In some embodiments, method 300 is largely completed by using point-of-sale device 210 and/or vendor system 220.

FIG. 3B depicts method 350 for processing a money transfer request. Method 350 includes receiving a request for a transfer pair verification (Block 360). As noted above, this request may be received by host system 240 from point-of-sale device 210 and/or vendor system 220. Method 350 includes attempting to verify the transfer pair (Block 360). Host system 240 accomplishes this process, in some embodiments, by comparing the received transfer pair code 140 with the transfer pair records 100. In some embodiments, host system 240 also compares a customer name received from POS device 210 with customer names contained in the transfer pair record 100 associated with the received transfer pair code 140. If the transfer pair is not verified (Decision Block 364) a denial may be returned to the money transfer requestor (Block 366). The denial may be transmitted to point-of-sale device 210 and/or vendor system 220 for relay to the customer requesting the money transfer. A denial may occur for a variety of reasons, including without limitation, an incorrect transfer pair code, an incomplete transfer pair record 100 associated with transfer pair code 140, a message or notice placed in transfer pair record 100 indicating further money transfers should be denied, or the like. In some embodiments, transfer pair 140 is verified and a verification is returned by host system 240 (Block 368).

Method 350 includes receiving the money transfer request (Block 370). This may, for example, comprise host system 240 receiving a notification from point-of-sale device 210 and/or vendor system 220 that the customer associated with the transfer pair verification has indeed paid for the money transfer. Receipt of the money transfer request may include receiving additional information, such as the transfer pair code that in turn identifies the sending and receiving customers, and the amount to be transferred in the event the transfer pair record allows variable transfer amounts. In some embodiments, method 350 further includes authorizing the transfer (Block 372). Authorizing the transfer may include host system 240 creating or maintaining a record that customers associated with the verified transfer pair have initiated a money transfer in a designated amount (fixed or variable) and that the money may be dispensed to second customer 280 upon proof of identity. As shown in FIG. 2, second customer 280 receives the money from a remote system 250, that in turn is coupled to host system 240. In some embodiments, system 240 makes the money available to second customer 280 only after a period of time has passed since first customer 260 paid. In this manner, non-cash payments made by first customer 260 for the money transfer can be approved or confirmed before dispensing the cash to second customer 280.

The advantages of the present invention, including the examples described in conjunction with FIGS. 1-3, are numerous. For the consumer, the consumer now has multiple locations at which they can initiate a money transfer. The consumer may multi-task by sending money from a location at which they had already planned to purchase groceries or the like. Further, the customer need not repeatedly provide all of the information typically needed for a money transfer as most or all of the information is maintained in the transfer pair record.

Benefits to the host system are numerous as well. For example, point-of-sale device 210 can facilitate payment authorization through the credit card authorization and check authentication processes. The money transfer host system will receive payments quickly from the vendor through the ACH or other money transfer processing system. In some embodiments, however, money transfer payments are made in cash, by cashiers check, or other certified funds. The host system operator further benefits by having customers who are satisfied at having additional locations at which a money transfer may be initiated and paid for. Host system 240 operator also benefits by not having to enter a complete data set for its frequent customer each time the customer wants to send money.

Benefits to the vendor operating point-of-sale device 210 also exist. First, the vendor, by participating in this process, is providing an additional service to customers which their competitors may not. This could increase consumer traffic to their store locations. For example, while the above examples describe the user proceeding to a grocery store to purchase items and at the same time initiating a money transfer, the reverse may happen. For example, the user may proceed to the grocery store to initiate a money transfer, and while they are there purchase a few items. In addition to the possibility of additional purchases, increased revenue may be received by the merchant through commissions paid by the customer and/or the money transfer host. In one embodiment, the vendor receives a small fee from the host for each money transfer initiated from the vendor location. Still another advantage to the vendor would be the float available to the vendor. The vendor may have in their account the money associated with the money transfers paid by their customers for a period of time before transmission of the money to the host. It will be appreciated by those skilled in the art that additional benefits to each of the parties of the methods of the present invention, arising from one or more components of the systems of the present invention may be realized within the scope of the present invention.

The invention has now been described in detail. However, it will be appreciated that the invention may be carried out in ways other than those illustrated in the aforesaid discussion, and that certain changes and modifications may be practiced within the scope of the appended claims. Accordingly, the scope of this invention is not intended to be limited by those specific examples, but rather is to be accorded in the scope represented in the following claims.

What is claimed is:

1. A method of processing money transfers, the method comprising:

receiving, by a host computer system from a vendor location, a request for a transfer pair verification;

verifying, by the host computer system, the transfer pair is associated with a valid transfer pair record;

sending, by the host computer system, the transfer pair verification to the vendor location;

receiving, by the host computer system, a money transfer request associated with the transfer pair from the vendor location, wherein the money transfer request comprises a money transfer amount;

authorizing, by the host computer system, a money transfer to at least one of a first and second customers associated with the transfer pair;

sending, by the host computer system, a money transfer fee amount to be collected from at least the first customer, wherein the money transfer fee amount is based on a money transfer fee schedule; and
wherein the money transfer fee comprises a vendor fee and a host system fee.

2. The method as in claim 1 further comprising establishing the transfer pair record associated with the first customer and the second customer.

3. The method as in claim 2 wherein establishing the transfer pair record comprises:
verifying the identity of at least one of the first and second customers;
receiving first and second customer information and creating a database record thereof; and
providing a transfer pair code to at least one of the first and second customers.

4. The method as in claim 3 wherein the transfer pair code comprises a money transfer recipient designator.

5. The method as in claim 3 wherein the transfer pair code comprises a string of alphanumeric characters.

6. The method as in claim 1 wherein the vendor location comprises a retail outlet.

7. The method as in claim 1 wherein sending the transfer pair verification further comprises sending a fee request to the vendor location.

8. The method as in claim 1 further comprising receiving a payment record corresponding to the money transfer request.

9. The method as in claim 1 further comprising dispensing the money associated with the money transfer request to the first or second customer.

10. The method as in claim 9 further comprising receiving a transfer pair code associated with the transfer pair from the first or second customer prior to the dispensing of the money.

11. The method as in claim 1 wherein the money transfer amount comprises a fixed amount associated with the transfer pair.

12. The method as in claim 1 wherein the money transfer fee amount is based on a sliding scale of the money transfer amount.

13. The method as in claim 1 wherein the money transfer fee amount is a based on a percentage of the money transfer amount.

14. A method of facilitating money transfers by a customer at a vendor, the method comprising:
receiving, by a host computer system, a money transfer request from a first customer, wherein the money transfer request comprises a money transfer amount;
receiving, by the host computer system, a transfer pair code from the first customer;
sending, by the host computer system, a request for a transfer pair verification to a host computer;
receiving, by the host computer system, the transfer pair verification from the host computer;
receiving, by the host computer system, a payment from the first customer for transfer to a second customer associated with the transfer pair code, wherein the payment comprises a money transfer fee that is determined according to a money transfer fee schedule; and
sending, by the host computer system, a record of the money transfer request and the payment to the host computer.

15. The method as in claim 14 further comprising providing a receipt to the first customer.

16. The method as in claim 14 further comprising receiving a purchase request for a consumer item from the first customer, and wherein the payment comprises a first payment portion associated with the consumer item and a second payment portion associated with the money transfer request.

17. The method as in claim 16 wherein the payment further comprises a third payment portion associated with a money transfer fee.

18. The method as in claim 14 wherein the money transfer fee comprises a percentage of the money transfer amount.

19. The method as in claim 14 wherein the money transfer fee comprises a fee based on a sliding scale of the money transfer amount.

20. A system for processing money transfers, comprising:
a host computer comprising a processor coupled to a database and a memory;
wherein the memory is configured to store sets of instructions which, when executed by the processor, cause the processor to:
receive a request to verify a transfer pair from a point-of-sale device;
verify the transfer pair is associated with a valid transfer pair record;
send a transfer pair verification to the point-of-sale device;
receive a money transfer request associated with the transfer pair from the point-of-sale device, wherein the money transfer request comprises a money transfer amount;
authorize a money transfer to at least one of a first customer and a second customer associated with the transfer pair; and
send a money transfer fee amount to the point-of-sale device, wherein the money transfer fee amount is determined according to a money transfer fee schedule.

21. The system as in claim 20 wherein the host computer further comprises code for establishing the transfer pair record associated with the first customer and the second customer.

22. The system as in claim 20 wherein the host computer further comprises code for receiving first and second customer information and creating a database record thereof to include a transfer pair code.

23. The system as in claim 22 wherein the host computer further comprises code for providing the transfer pair code to at least one of the first and second customers.

24. The system as in claim 20 wherein the money transfer fee amount is based on a sliding scale of the money transfer amount.

25. The system as in claim 20 wherein the money transfer fee amount is a based on a percentage of the money transfer amount.

26. A system for processing money transfers, comprising:
a host computer comprising a processor coupled to a database;
a point-of-sale (POS) device integrated in a merchant computer network, wherein the POS device is coupled to the host computer and the POS device is configured to receive a request to verify a transfer pair and transmit the request to the host computer; and
wherein the host computer is configured to verify the transfer pair is associated with a valid transfer pair record and send a transfer pair verification to the POS device;
wherein the POS device is further configured to send a money transfer request associated with the transfer pair to the host computer, wherein the money transfer request comprises a money transfer amount; and
wherein the host computer is further configured to authorize a money transfer to at least one of a first customer and a second customer associated with the transfer pair.

27. The system as in claim 26, wherein the host computer is further configured to send a money transfer fee amount to the POS device, wherein the money transfer fee amount is determined according to a money transfer fee schedule.

28. The system as in claim 27, wherein the money transfer fee schedule comprises deducting the money transfer fee amount from the money transfer amount.

29. The system as in claim 27, wherein the money transfer fee schedule comprises adding the money transfer fee amount to the money transfer amount.

30. The system as in claim 27, wherein the money transfer fee schedule comprises determining the money transfer fee amount based on a percentage of the money transfer amount.

31. The system as in claim 27, wherein the money transfer fee is paid by either the host computer operator or the merchant.

32. The system as in claim 26, wherein at least one of the first and second customers associated with the transfer pair is a pre-authorized customer.

33. The system as in claim 32, wherein transactions occur between pre-authorized customers by collecting less information than customers that are not pre-authorized.

34. The system as in claim 26, wherein the POS device is further configured to present a list of transfer pairs based on a history for a customer and to allow the customer to select from the list of transfer pairs to establish a new money transfer.

35. A method of processing money transfers, the method comprising:

receiving, by a host computer system, from a sender, a request for a transfer pair verification, wherein the request includes a request to establish a recurring money transfer associated with the transfer pair, wherein the request to establish a recurring money transfer includes a recurrence schedule;

verifying, by the host computer system, the transfer pair is associated with a valid transfer pair record;

establishing, by the host computer system, a recurring money transfer for the transfer pair based on the recurrence schedule;

sending, by the host computer system, the transfer pair verification to the vendor location; and authorizing, by the host computer system, money transfers to a recipient associated with the transfer pair based on the recurrence schedule.

36. The method as in claim 35, wherein the recurrence schedule comprises one or more of the following: a monthly transfer schedule, a bi-monthly transfer schedule, and a weekly transfer schedule.

37. The method as in claim 35, further comprising verifying the identify of at least one of the sender and the recipient.

38. The method as in claim 35, further comprising in response to verifying the transfer pair, sending the sender a notification indicating that the transfer pair has been verified.

39. The method as in claim 35, further comprising in response to authorizing at least one of the money transfers, sending the recipient a notification indicating that the money transfer has been authorized.

\* \* \* \* \*